US011468596B2

United States Patent
Tsuchiya

(10) Patent No.: US 11,468,596 B2
(45) Date of Patent: Oct. 11, 2022

(54) BIRD'S-EYE VIEW IMAGE GENERATING DEVICE FOR VESSEL, AND CALIBRATION METHOD OF THE SAME

(71) Applicant: YAMAHA HATSUDOKI KABUSHIKI KAISHA, Iwata (JP)

(72) Inventor: Toshiya Tsuchiya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 1011 days.

(21) Appl. No.: 16/180,052

(22) Filed: Nov. 5, 2018

(65) Prior Publication Data

US 2019/0147623 A1 May 16, 2019

(30) Foreign Application Priority Data

Nov. 13, 2017 (JP) .............................. JP2017-218363

(51) Int. Cl.
| | |
|---|---|
| G06T 7/30 | (2017.01) |
| G06T 7/80 | (2017.01) |
| G03B 37/04 | (2021.01) |
| G06T 3/40 | (2006.01) |

(52) U.S. Cl.
CPC .............. *G06T 7/80* (2017.01); *G03B 37/04* (2013.01); *G06T 3/4038* (2013.01); *G06T 7/30* (2017.01); *G06T 2207/30204* (2013.01)

(58) Field of Classification Search
None
See application file for complete search history.

(56) References Cited

U.S. PATENT DOCUMENTS

2011/0187816 A1* 8/2011 Shimizu ............... B60R 1/00
348/36
2017/0113342 A1* 4/2017 Abramson ........... G05D 1/0246

FOREIGN PATENT DOCUMENTS

| EP | 2 196 388 A1 | 6/2010 |
|---|---|---|
| EP | 3 076 654 A1 | 10/2016 |
| EP | 3 206 184 A1 | 8/2017 |
| JP | 04-031098 U | 3/1992 |

(Continued)

OTHER PUBLICATIONS

Official Communication issued in corresponding European Patent Application No. 18205145.8, dated Oct. 12, 2021.

(Continued)

*Primary Examiner* — Yanna Wu
(74) *Attorney, Agent, or Firm* — Keating and Bennett, LLP

(57) ABSTRACT

A bird's-eye view image generating device for a vessel generates a bird's-eye view image from a view point above a vessel by projective transformation of images obtained by cameras installed on the vessel into a bird's-eye view plane. Imaging regions to be respectively imaged by the cameras are positioned such that imaging regions adjacent to each other have an overlapping region. A method of calibrating the bird's-eye view image generating device includes acquiring calibration images by imaging a calibration marker with the cameras in which the calibration marker is positioned in the overlapping region in a calibration plane, and acquiring application parameters to be applied for projective transformation of the calibration images into the calibration plane so that images of the calibration marker included in the calibration images match each other.

8 Claims, 11 Drawing Sheets

(56) References Cited

FOREIGN PATENT DOCUMENTS

JP    2010-244326 A    10/2010
WO    2014/103683 A1    7/2014

OTHER PUBLICATIONS

Hedi et al., "A System for Vehicle Surround View", 10th IFAC Symposium on Robot Control International Federation of Automatic Control, Sep. 5-7, 2012, pp. 120-125.

* cited by examiner

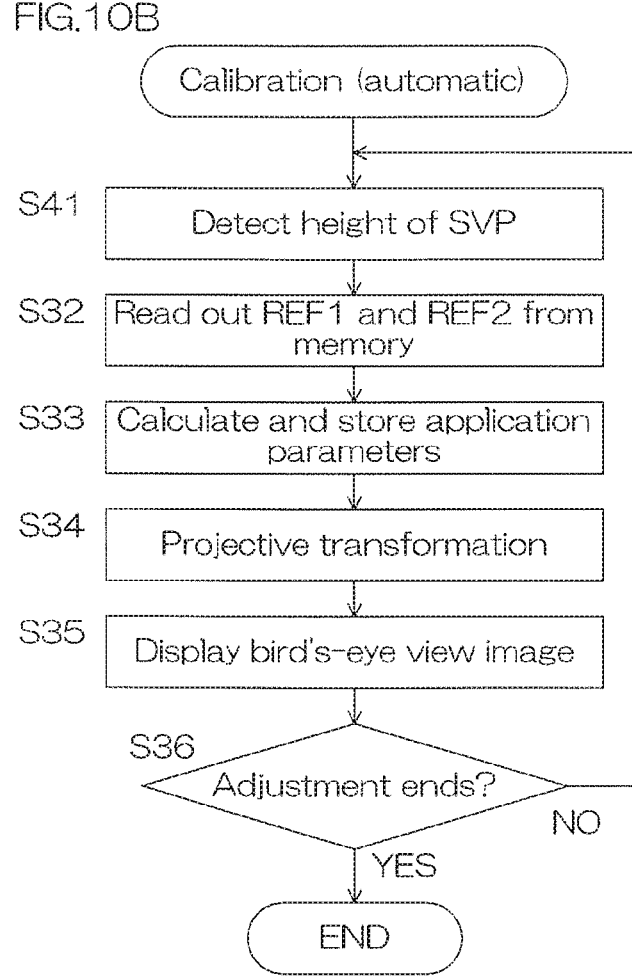

BIRD'S-EYE VIEW IMAGE GENERATING DEVICE FOR VESSEL, AND CALIBRATION METHOD OF THE SAME

CROSS REFERENCE TO RELATED APPLICATIONS

This application claims the benefit of priority to Japanese Patent Application No. 2017-218363 filed on Nov. 13, 2017. The entire contents of this application are hereby incorporated herein by reference.

BACKGROUND OF THE INVENTION

1. Field of the Invention

The present invention relates to a device that generates a bird's-eye view image overlooking the surroundings of a vessel, and a calibration method of the same.

2. Description of the Related Art

Japanese Utility Model Application Publication No. 4-31098 discloses a steering assisting device that facilitates one-man control of a large vessel. In a detailed example, four TV cameras to image each of the four areas around a vessel respectively are provided. Images taken by these TV cameras are made into a composite image and displayed on a display. An operator can steer the vessel by looking at the image displayed on the display.

Japanese Patent Application Publication No. 2010-244326 discloses an in-vehicle periphery image display. In this device, four cameras that image four quarters of a vehicle are disposed so that their imaging regions partially overlap. By respective projective transformation and synthesizing images imaged by the respective cameras, a bird's-eye view image is generated. When a problem occurs in a bird's-eye view image portion corresponding to any one of the cameras, that camera is set as an adjustment target camera, and parameters for projective transformation are adjusted. In detail, a target board on which a square calibration pattern is drawn is disposed on the ground within an overlapping range between an imaging region of the adjustment target camera and an imaging region of another camera. The parameters for projective transformation are adjusted so that calibration patterns imaged by these two cameras match in the bird's-eye view image.

SUMMARY OF THE INVENTION

The inventor of preferred embodiments of the present invention described and claimed in the present application conducted an extensive study and research regarding a bird's-eye view image generating device for a vessel, such as the one described above, and in doing so, discovered and first recognized new unique challenges and previously unrecognized possibilities for improvements as described in greater detail below.

The inventor of preferred embodiments of the present invention developed a bird's-eye view image generating device for a vessel that generates a bird's-eye view image overlooking the surroundings of a vessel. In the process of this development, the inventor discovered that it is not easy to generate an appropriate bird's-eye view image just by diverting the in-vehicle periphery image display described in Japanese Patent Application Publication No. 2010-244326 to a vessel because parameters differ vessel by vessel, and has provide a solution to this problem.

Preferred embodiments of the present invention provide bird's-eye view image generating devices for vessels that facilitate the generation of an appropriate bird's-eye view image, and calibration methods of the same.

In order to overcome the previously unrecognized and unsolved challenges described above, a preferred embodiment of the present invention provides a method of calibrating a bird's-eye view image generating device for a vessel. The bird's-eye view image generating device for a vessel generates a bird's-eye view image from a view point above the vessel by projective transformation of images obtained by a plurality of cameras installed on the vessel into a bird's-eye view plane. A plurality of imaging regions to be respectively imaged by the plurality of cameras are set so that imaging regions adjacent to each other have an overlapping region. The method includes acquiring a plurality of calibration images by imaging a calibration marker with the plurality of cameras in a state in which the calibration marker is positioned in the overlapping region in a calibration plane, and acquiring application parameters that should be applied for projective transformation of the plurality of calibration images into the calibration plane so that images of the calibration marker included in the plurality of calibration images match each other.

According to a preferred embodiment of the present invention, the calibration plane is the bird's-eye view plane at a position higher than the ground surface on land.

The "ground surface" is, herein, a ground surface when the vessel is on land, and is a horizontal plane not higher than a lowest position of the vessel.

Parameters to obtain a bird's-eye view image by projective transformation depend on the positional relationship between a camera position and a plane to be projected on (in Japanese Patent Application Publication No. 2010-244326, the ground surface). In the case of a vehicle, the positional relationship between the camera and the ground surface is substantially constant if the type of vehicle is the same, and therefore, it is not necessary to adjust the parameters for each vehicle. On the other hand, usually, vessels are manufactured one at a time and on demand from each user, so that in general the positions of the cameras differ among vessels. Therefore, the parameters must be adjusted for each vessel. Moreover, parameter adjustment must be made by floating the vessel on the surface of water. This is because a height of the surface of the water (draft line) with respect to the hull depends on a weight of the vessel which differs among vessels.

Preferred embodiments of the present invention provide solutions to this problem.

A bird's-eye view image generating device for a vessel according to a preferred embodiment of the present invention generates a bird's-eye view image from a view point above a vessel by projective transformation of a plurality of images respectively obtained by a plurality of cameras into a bird's-eye view plane. By properly adjusting parameters for projective transformation, an appropriate bird's-eye view image is obtained. Calibration is performed by adjusting parameters to be applied to the projective transformation.

In a calibration method according to a preferred embodiment of the present invention, a calibration marker is positioned in a bird's-eye view plane that is set on land at a position higher than the ground surface. At this time, the calibration marker is positioned in a region (overlapping region) in which imaging regions adjacent to each other of a plurality of cameras overlap each other. Images obtained by the plurality of cameras in this state are calibration images. Therefore, the plurality of calibration images obtained from the plurality of cameras include an image of the calibration marker in common. The parameters for projective transformation are adjusted so that calibration marker images in the plurality of calibration images match each other when the plurality of calibration images are subjected to projective transformation. Accordingly, proper application parameters that should be applied to projective transformation are obtained.

In a method according to a preferred embodiment, in a state in which the vessel is on land, a bird's-eye view plane is set at a position higher than the ground surface, and calibration is performed by using a calibration marker positioned in the bird's-eye view plane. That is, without floating the vessel on the surface of the water, the bird's-eye view image generating device for a vessel is easily calibrated.

In a method according to a preferred embodiment of the present invention, the step of positioning the calibration marker uses a jig that is supported by the vessel and holds the calibration marker. According to this preferred embodiment, in a state in which the calibration marker is held by a jig supported by the vessel, calibration images are acquired. Therefore, the calibration marker is easily and accurately positioned in a bird's-eye view plane set at a height away from the ground surface. That is, it is not necessary to hold the calibration marker by a structure raised from the ground, such that the calibration marker is easily used. The bird's-eye view plane is a plane determined relative to the hull, so that by holding the calibration marker by the vessel with the jig, the calibration marker is accurately positioned in the bird's-eye view plane.

In a method according to a preferred embodiment of the present invention, the jig is able to change the height of the calibration marker with respect to the vessel. According to this preferred embodiment, the relative height of the calibration marker to the vessel is changeable, so that calibrations with the height of a bird's-eye view plane are easily varied.

A preferred embodiment of the present invention provides a method of calibrating a bird's-eye view image generating device for a vessel that generates a bird's-eye view image from a view point above a vessel by projective transformation, into a bird's-eye view plane, of images obtained by a plurality of cameras that are installed on the vessel with their respective imaging regions being positioned so that imaging regions adjacent to each other have an overlapping region. This preferred embodiment includes a step of acquiring a plurality of first calibration images by respectively obtaining images with the plurality of cameras in a state in which a first calibration plane is set at a first height and a first calibration marker is positioned in the overlapping region on the first calibration plane, a step of acquiring a plurality of second calibration images by respectively obtaining images with the plurality of cameras in a state in which a second calibration plane is set at a second height different from the first height and a second calibration marker is positioned in the overlapping region in the second calibration plane, a step of acquiring first reference parameters for projective transformation of the plurality of first calibration images into the first calibration plane so that images of the first calibration marker included in the plurality of first calibration images match each other, and a step of acquiring second reference parameters for projective transformation of the plurality of second calibration images into the second calibration plane so that images of the second calibration marker included in the plurality of second calibration images match each other.

One or both of the first and second calibration planes may coincide with the bird's-eye view plane, or both of them may be planes different from the bird's-eye view plane.

A height of a draft line of a vessel depends on a weight of cargo loaded on the vessel and the number of vessel passengers. In the case of a large vessel such as one assumed in Japanese Utility Model Application Publication No. 4-31098, a height of a draft line may not greatly change. However, particularly in the case of a small vessel, a height of a draft line easily changes depending on the weight of cargo and the number of passengers.

Further, in the case of a large vessel assumed in Japanese Utility Model Application Publication No. 4-31098, it is only required to assume a certain anchorage position on a quay or pier, so that a height of a plane on which a bird's-eye view image should be formed (bird's-eye view plane) can be regarded as fixed. Additionally, in the case of a large vessel, cameras can be disposed at correspondingly high positions from the surface of the water, so that by setting a bird's-eye view plane on the surface of the water (height of a draft line) or an upper surface of the quay, large problems are unlikely to occur.

However, particularly in the case of a small vessel, a fixed anchorage position is rarely secured, and the vessel is required to be anchored at various positions such as positions on a fixed pier, a floating pier, and an anchorage position demarcated by poles on the surface of the water. Therefore, a height of a bird's-eye view plane varies on a surface of the fixed pier or a surface of the floating pier, and on the surface of the water, etc. In addition, in the case of a small vessel, installation heights of the cameras are low, so that an appropriate bird's-eye view image cannot be obtained unless projective transformation to which different parameters are applied is performed depending on the height of the bird's-eye view plane.

Preferred embodiments of the present invention provide solutions to this problem.

In a method according to a preferred embodiment of the present invention, with respect to a first calibration plane at a first height and a second calibration plane at a second height, a plurality of first calibration images and a plurality of second calibration images are respectively acquired. Then, first reference parameters for projective transformation of the plurality of first calibration images into the first calibration plane are obtained. Similarly, second reference parameters for projective transformation of the plurality of second calibration images into the second calibration plane are obtained. In this way, proper parameters for projective transformation are obtained for the first and second calibration planes which are planes at the first and second heights, so that proper parameters are able to be selected according to a variation or change in height of the bird's-eye view plane. Accordingly, an appropriate bird's-eye view image is easily generated.

A method according to a preferred embodiment of the present invention further includes a step of acquiring a height of the bird's-eye view plane, and a step of acquiring application parameters that should be applied for projective transformation of images obtained by the plurality of cameras into the bird's-eye view plane based on the height of the bird's-eye view plane and one or both of the first reference parameters and the second reference parameters.

In this preferred embodiment, a height of the bird's-eye view plane is acquired, and application parameters for projective transformation into the bird's-eye view plane at this height are acquired based on the first and second reference parameters. Accordingly, proper application parameters are acquired according to a variation or change in height of the bird's-eye view plane, so that an appropriate bird's-eye view image is easily generated.

For example, based on the acquired height of the bird's-eye view plane and the first and second heights, application parameters may be obtained through interpolation of the first and second reference parameters.

In a method according to a preferred embodiment of the present invention, the step of acquiring a height of the bird's-eye view plane includes receiving an input of a height from an input that is operated by an operator. According to this preferred embodiment, due to an operator operating the input, a height of the bird's-eye view plane is set. Then, application parameters for projective transformation into the bird's-eye view plane at the set height is obtained based on the first and second reference parameters. In this way, proper application parameters with respect to a bird's-eye view plane at a height set by an operator are acquired, so that an appropriate bird's-eye view image is easily generated.

In a preferred embodiment of the present invention, the step of acquiring a height of the bird's-eye view plane includes detecting a height of the bird's-eye view plane with a sensor installed on the vessel. According to this preferred embodiment, a height of the bird's-eye view plane is detected by the sensor installed on the vessel. Then, application parameters for projective transformation into the bird's-eye view plane at the detected height are obtained based on the first and second reference parameters. Therefore, proper application parameters with respect to the bird's-eye view plane at the height detected by the sensor are acquired, so that without requiring operation by an operator, an appropriate bird's-eye view image is easily generated.

For example, the sensor may detect a height of the surface of the water with respect to the vessel. Also, the sensor may detect a height of an upper surface of a pier with respect to the vessel. More generally, the sensor may detect a height of a surface in a horizontal plane surrounding the vessel. The surroundings of the vessel refers to, in this case, a region to be imaged by cameras installed on the vessel.

In a method according to a preferred embodiment of the present invention, the first height and the second height are set at positions higher than the ground surface on land. According to this preferred embodiment, first and second calibration markers are respectively positioned in first and second calibration planes set at positions higher than the ground surface on land. That is, in a state in which the vessel is on land, calibration planes are set at positions higher than the ground surface, and by using calibration markers positioned in the calibration planes, calibration is performed. Therefore, without floating the vessel on the surface of the water, the bird's-eye view image generating device for a vessel is easily calibrated.

A preferred embodiment of the present invention provides a bird's-eye view image generating device for a vessel that generates a bird's-eye view image from a view point above a vessel by projective transformation, into a bird's-eye view plane, of images obtained by a plurality of cameras that are installed on the vessel with their respective imaging regions being positioned so that imaging regions adjacent to each other have an overlapping region. The generating device includes a reference parameter memory that stores first reference parameters for projective transformation of images obtained by the plurality of cameras into a first calibration plane set at a first height, and second reference parameters for projective transformation of images obtained by the plurality of cameras into a second calibration plane set at a second height different from the first height, and a calculator that calculates application parameters that should be applied for projective transformation of images obtained by the plurality of cameras into the bird's-eye view plane based on one or both of the first reference parameters and the second reference parameters.

With this bird's-eye view image generating device for a vessel, by projective transformation of a plurality of images respectively obtained by a plurality of cameras installed on the vessel into a bird's-eye view plane, a bird's-eye view image from a view point above a vessel is generated. The reference parameter memory stores first and second reference parameters for projective transformation into the first calibration plane at the first height and the second calibration plane at the second height. The calculator uses one or both of these first and second reference parameters to calculate application parameters for projective transformation into the bird's-eye view plane. Therefore, projective transformation using proper application parameters is performed according to a variation or change in height of the bird's-eye view plane, so that an appropriate bird's-eye view image is easily generated.

In a preferred embodiment of the present invention, the bird's-eye view image generating device for a vessel further includes an acquirer that acquires a height of the bird's-eye view plane, and the calculator uses the acquired height of the bird's-eye view plane.

With this structure, a height of the bird's-eye view plane is acquired, and application parameters for projective transformation into the bird's-eye view plane at this height is acquired based on the first and second reference parameters. Accordingly, proper application parameters are acquired according to a variation or change in height of the bird's-eye view plane, so that an appropriate bird's-eye view image is easily generated.

For example, the calculator may obtain application parameters through interpolation of the first and second reference parameters based on the acquired height of the bird's-eye view plane and the first and second heights.

In a preferred embodiment of the present invention, the acquirer that acquires a height of the bird's-eye view plane includes an input to be operated by an operator. With this structure, with an operator operating the input, a height of the bird's-eye view plane is set. Then, application parameters for projective transformation into the bird's-eye view plane at the set height are obtained based on the first and second reference parameters. In this way, proper application parameters with respect to a bird's-eye view plane at a height set by an operator are acquired, so that an appropriate bird's-eye view image is easily generated.

In a preferred embodiment of the present invention, the acquirer that acquires a height of the bird's-eye view plane includes a sensor that is installed on the vessel and detects a height of the bird's-eye view plane. With this structure, a height of the bird's-eye view plane is detected by the sensor installed on the vessel. Then, application parameters for projective transformation into the bird's-eye view plane at the detected height are obtained based on the first and second reference parameters. Therefore, proper application parameters with respect to the bird's-eye view plane at the height detected by the sensor are acquired, so that without requiring an operation by an operator, an appropriate bird's-eye view image is easily generated.

For example, the sensor may detect a height of the surface of the water with respect to the vessel. Also, the sensor may detect a height of an upper surface of a pier with respect to the vessel. More generally, the sensor may detect a height of a surface in a horizontal plane surrounding the vessel. The surroundings of the vessel refers to, in this case, a region to be imaged by cameras installed on the vessel.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10B is a flowchart describing calibration at the time of use, showing a flow of the calibration in an automatic mode.

DETAILED DESCRIPTION OF THE PREFERRED EMBODIMENTS

Figure 1:
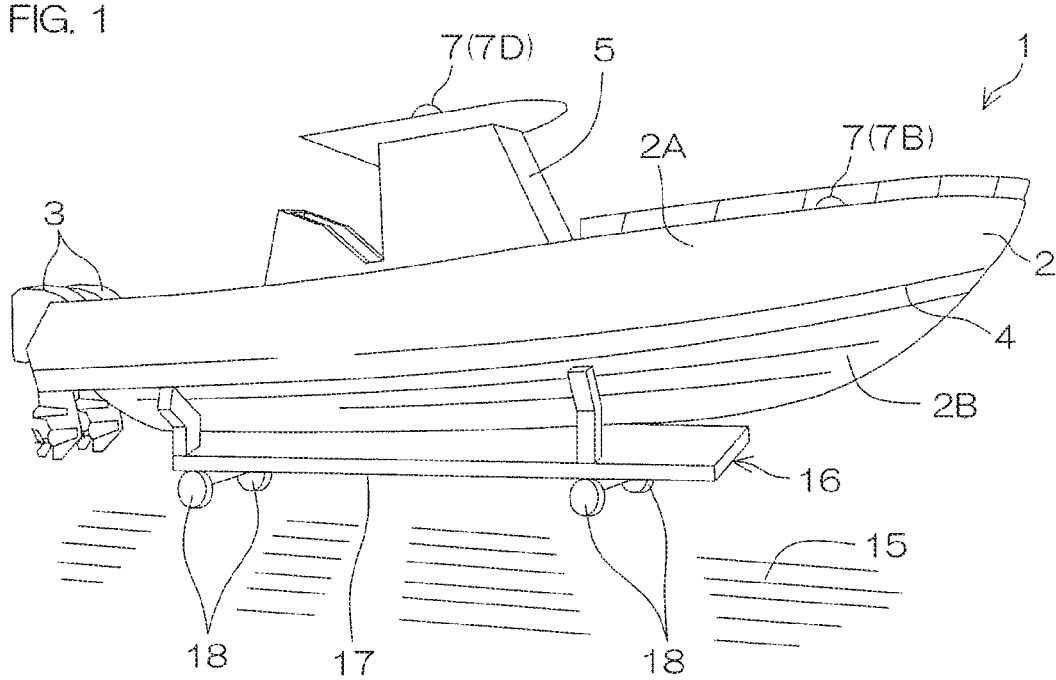
FIG. 1 is a perspective view of a vessel according to a preferred embodiment of the present invention.

FIG. 1 is a perspective view of a vessel according to a preferred embodiment of the present invention. A vessel 1 may be a so-called small vessel, for example. Small vessels are vessels with a gross tonnage of, for example, less than about 20 tons. However, vessels with a gross tonnage of not less than 20 tons may also be considered small vessels if they are less than, for example, about 20 meters long.

The vessel 1 includes a hull 2 and one or more propulsion apparatuses 3. The propulsion apparatus 3 is, for example, in this preferred embodiment, an outboard motor attached to the stern of the hull 2. A cockpit 5 is provided near the center of the hull 2. A steering wheel, an accelerator lever, a display, and various operation switches, etc., are installed inside the cockpit 5.

A plurality of cameras 7 to obtain images of the surroundings of the hull 2 are installed on the vessel 1. The cameras 7 may be attached to the vicinities of upper edges of a peripheral wall portion 2A of the hull 2, or may be attached to upper edge portions of the cockpit 5.

FIG. 1 shows a state in which the vessel 1 is on land. The vessel 1 is supported on a carriage 16 placed on the ground surface 15. The carriage 16 includes a carriage main body 17 that comes into contact with a hull bottom 2B and supports the hull 2 from below, and wheels 18 attached to a lower portion of the carriage main body 17 so as to be capable of rolling. A draft line 4 of the vessel 1 supported on the carriage 16 is not necessarily parallel to the ground surface 15.

Figure 2:
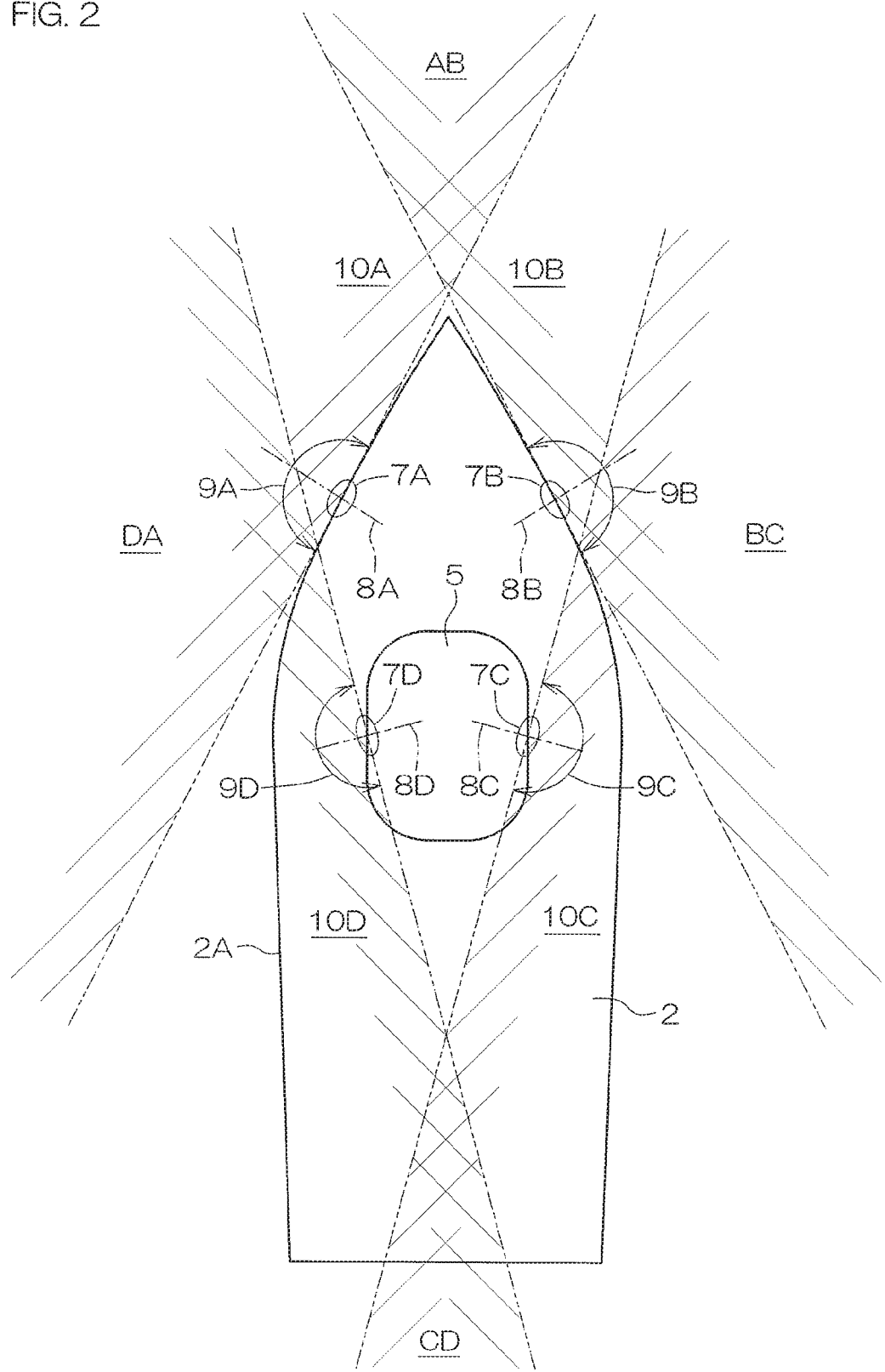
FIG. 2 is a schematic plan view that illustrates an example of the disposition of cameras.

FIG. 2 is a schematic plan view that illustrates an example of the disposition of the plurality of cameras 7. In this example, the plurality of cameras 7 include a left front camera 7A and a right front camera 7B respectively positioned on upper edges of peripheral wall portions 2A on a front stroke side and a front bow side of the hull 2. In this example, the plurality of cameras 7 further include a left rear camera 7D and a right rear camera 7C respectively positioned on upper edges on the left and right of the cockpit 5. These cameras 7 preferably have a wide-angle lens with a wide angle of view, and more specifically, have a fish-eye lens.

The left front camera 7A has, for example, in a planar view, an angle of view 9A of about 180 degrees or more on the left front side of the hull 2 around an optical axis 8A orthogonal or substantially orthogonal to the stroke side front edge portion of the hull 2, and has, in a planar view, a fan-shaped imaging region 10A having, as a central angle, the angle of view 9A. Similarly, the right front camera 7B has, for example, in a planar view, an angle of view 9B of about 180 degrees or more on the right front side of the hull 2 around an optical axis 8B orthogonal or substantially orthogonal to the bow side front edge portion of the hull 2, and has, in a planar view, a fan-shaped imaging region 10B having, as a central angle, the angle of view 9B. Further, the left rear camera 7D has, for example, in a planar view, an angle of view 9D of about 180 degrees or more on the left side of the hull 2 around an optical axis 8D orthogonal or substantially orthogonal to a front-rear direction of the hull 2, and has, in a planar view, a fan-shaped imaging region 10D having, as a central angle, the angle of view 9D. Similarly, the right rear camera 7C has, for example, in a planar view, an angle of view 9C of about 180 degrees or more on the right side of the hull 2 around an optical axis 8C orthogonal or substantially orthogonal to the front-rear direction of the hull 2, and has, in a planar view, a fan-shaped imaging region 10C having, as a central angle, the angle of view 9C. The optical axes 8A to 8D of these cameras 7A to 7D are inclined downward.

The respective imaging regions 10A and 10B of the left front camera 7A and the right front camera 7B are adjacent to each other, and have an overlapping region AB at the front of the hull 2. The respective imaging regions 10B and 10C of the right front camera 7B and the right rear camera 7B are adjacent to each other, and have an overlapping region BC on the right side of the hull 2. The respective imaging regions 10C and 10D of the right rear camera 7C and the left rear camera 7D are adjacent to each other, and have an overlapping region CD at the back of the hull 2. Further, the respective imaging regions 10D and 10A of the left rear camera 7D and the left front camera 7A are adjacent to each other, and have an overlapping region DA on the left side of the hull 2.

Figure 3:
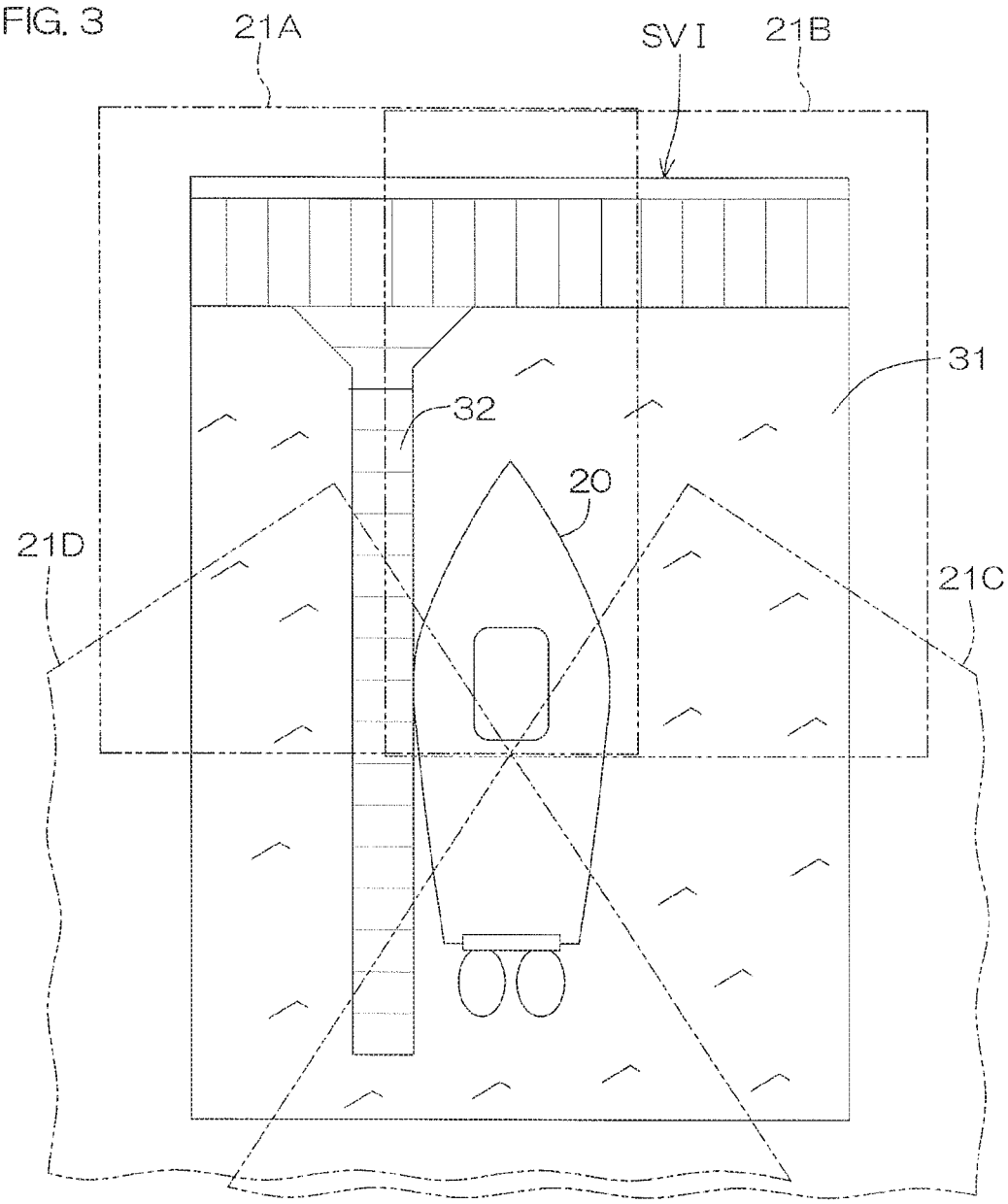
FIG. 3 shows an example of a bird's-eye view image.

FIG. 3 shows an example of a bird's-eye view image. The bird's-eye view image SVI is an image from a view point above the vessel 1, and is obtained by creating bird's-eye view transformed images 21A to 21D by projective transformation of camera images respectively obtained by the plurality of cameras 7A to 7D into a bird's-eye view plane (for example, a horizontal plane), and synthesizing the bird's-eye view transformed images. In the example shown in FIG. 3, further, an image (vessel image) 20 showing the vessel 1 in a planar view is synthesized. Regarding the overlapping regions AB, BC, CD, and DA, for example, each of the overlapping regions AB, BC, CD, and DA may be halved, and image portions in the bird's-eye view transformed images of the respective imaging regions adjacent to each other may be used. The bird's-eye view plane is lower than all of the plurality of cameras 7, and is, for example, a horizontal plane. The horizontal plane is, in this case, a plane that becomes parallel or substantially parallel to the surface of the water when the vessel 1 floats on the surface of the water and is anchored or made to run at an extremely low speed.

Proper parameters that should be applied to projective transformation differ depending on a positional relationship between each camera 7 and the bird's-eye view plane. When the parameters are not proper, images obtained from the imaging regions adjacent to each other are a mismatch in the bird's-eye view image SVI. For example, proper parameters when a bird's-eye view plane is set on a surface of the water 31 are different from those when a bird's-eye view plane is set at a height of an upper surface 32 of a pier projecting upward from the surface of the water.

Figure 4:
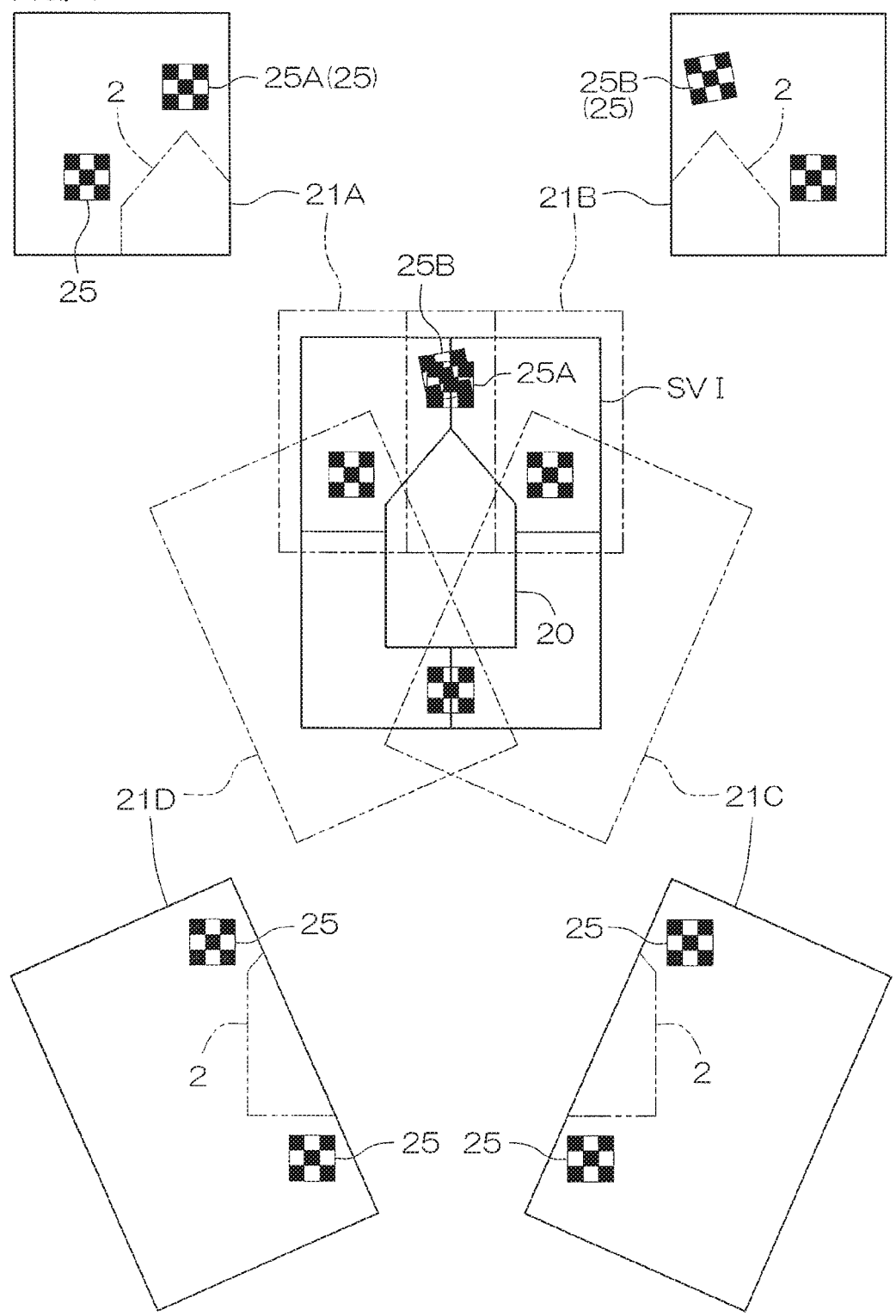
FIG. 4 is a view showing an outline of calibration.

FIG. 4 is a view to describe setting the proper parameters, that is, an example of calibration. In FIG. 4, a bird's-eye view image SVI including a vessel image 20, and bird's-eye view transformed images 21A to 21D obtained by projective transformation of images obtained by the plurality of cameras 7A to 7D, are shown.

For example, a case is assumed in which a calibration marker is positioned in the overlapping region AB of the left front camera 7A and the right front camera 7B and images of the surroundings of the vessel 1 are obtained by the respective cameras 7A and 7B, and these images are subjected to projective transformation to obtain bird's-eye view transformed images 21A and 21B. These bird's-eye view transformed images 21A and 21B respectively include images (calibration marker images) 25A and 25B of the calibration marker. Then, the bird's-eye view transformed images 21A and 21B are superimposed on each other based on the position of the hull 2. At this time, when the two calibration marker images 25A and 25B deviate from each other, one or both of the projective transformation parameters respectively applied to the left front camera 7A and the left rear camera 7B are improper.

"When calibration marker images deviate from each other" includes a case in which the two calibration marker images 25A and 25B are in a relationship of parallel translation, a case in which they are in a relationship of rotational transfer, and a case in which they are in a combined relationship of parallel translation and rotational transfer. Further, a case in which the deviation is caused by a difference in shape between the calibration marker images 25A and 25B is included.

By adjusting the projective transformation parameters so that the two calibration marker images 25A and 25B match and overlap each other, calibration is achieved, and a proper bird's-eye view image SVI is obtained.

The calibration marker 25 is, for example, in the example shown in FIG. 4, a lattice-shaped checkered pattern. For example, it is also possible that, focusing on lattice points each shared by a pair of white squares and a pair of black squares, the projective transformation parameters are adjusted so that a distance between coordinates of corresponding lattice points in the two calibration marker images 25A and 25B is reduced or minimized in the bird's-eye view plane. Preferably, the projective transformation parameters are adjusted so that the distances between coordinates of corresponding lattice points are reduced or minimized for two or more (more preferably, three or more, and further preferably, four or more) lattice points.

Figure 5:
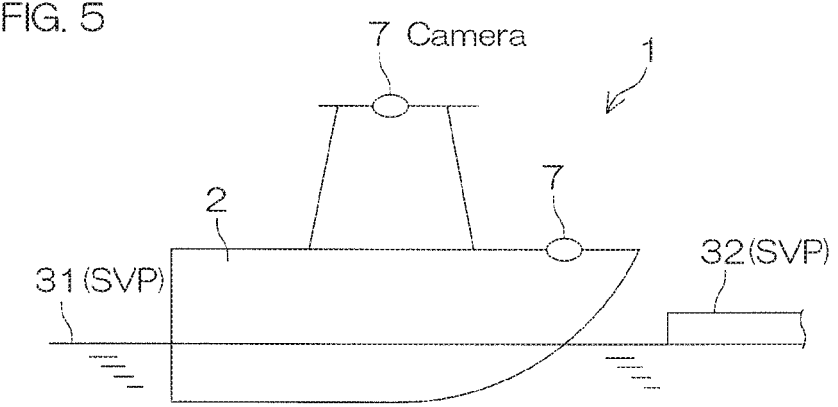
FIG. 5 is a schematic side view showing positional relationships between a camera and a bird's-eye view plane.

FIG. 5 is a schematic side view showing positional relationships between a camera and a bird's-eye view plane.

As described above, the bird's-eye view plane SVP may be the surface of the water 31, or may be an upper surface 32 of a pier projecting from the surface of the water 31. A relative height of the surface of the water 31 or the pier upper surface 32 with respect to the hull 2 may change depending on factors such as the cargo on the vessel 1 and the number of vessel passengers. Thus, the bird's-eye view plane SVP may change mainly in height, so that the positional relationship between the camera 7 and the bird's-eye view plane SVP is not always constant. Accordingly, appropriate parameters for the projective transformation also change.

In the case of a large vessel 1, it can be considered that the anchorage position thereof in a port is limited, and the positional relationship between a camera and a bird's-eye view plane does not substantially change due to an influence of the cargo, etc. However, in the case of a small vessel, an anchorage position thereof varies. In addition, a distance from a bird's-eye view plane to the camera is short, so that the positional relationship of these greatly changes according to an amount of loaded cargo, etc. Therefore, the parameters to be applied to the projective transformation also greatly change.

Figure 6:
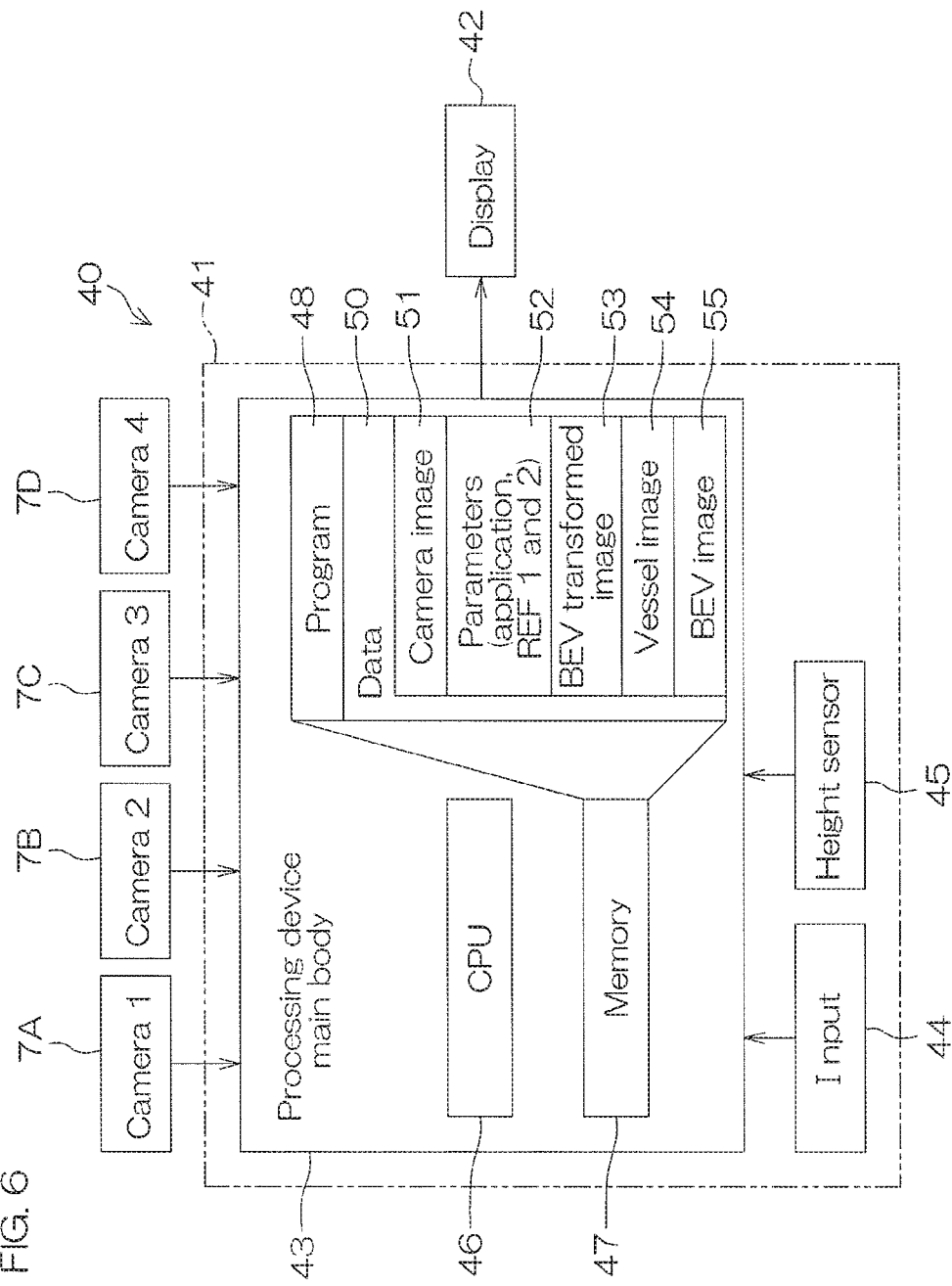
FIG. 6 is a block diagram that shows an electrical configuration of a bird's-eye viewing system.

FIG. 6 is a block diagram showing an electrical configuration of a bird's-eye viewing system 40 that is installed on the vessel 1 and provides a bird's-eye view image SVI to a user. The bird's-eye viewing system 40 includes cameras 7A to 7D, a bird's-eye view image generating device 41, and a display 42. The bird's-eye view image generating device 41 includes a processing device main body 43, an input 44, and a height sensor 45. The processing device main body 43 includes a processor (CPU) 46 and a memory 47. The processor 46 is an example of a calculator according to a preferred embodiment of the present invention. The memory 47 is an example of a reference parameter memory according to a preferred embodiment of the present invention. The input 44, the height sensor 45, and the display 42 are connected to the processing device main body 43. The display 42 may be a two-dimensional display such as a liquid crystal display panel. The input 44 may be, for example, a touch panel provided on a display screen of the display 42. The height sensor 45 is, for example, a sensor that detects a relative height of the bird's-eye view plane SVP to the hull 2. More specifically, the height sensor 45 may be a distance sensor.

In the memory 47, a program 48 to be executed by the processor 46, and data 50 that is used in calculations performed by the processor 46 or that is generated by the calculations, are stored. The data 50 to be stored in the memory 47 includes image data (camera image data) 51 output from the cameras 7, parameters 52 for projective transformation of the camera image data 51, and bird's-eye view (BEV) transformed image data 53 obtained by projective transformation of the image data. The data 50 may include image data (vessel image data) 54 representing the vessel image 20 showing the vessel 1 in a planar view. The data 50 further includes bird's-eye view image (BEV) data 55 obtained by synthesizing the bird's-eye view transformed image data 53 and the vessel image data 54. The parameters 52 include first reference parameters REF1 and second reference parameters REF2, which define references for calculating proper parameters corresponding to a height H of the bird's-eye view plane SVP. In addition, the parameters 52 include application parameters to be applied for projective transformation.

The first reference parameters REF1 are parameters properly determined for projective transformation into a bird's-eye view plane CP1 (hereinafter, referred to as a "first calibration plane") at a first height H1. The second reference parameters REF2 are parameters properly determined for projective transformation into a bird's-eye view plane CP2 (hereinafter, referred to as a "second calibration plane") at a second height different from the first height H1. When the bird's-eye view plane SVP is set at a height H other than the first and second heights H1 and H2, the processor 46 performs calculations (for example, linear interpolation) using the first and second reference parameters REF1 and REF2. Accordingly, proper parameters that should be applied to projective transformation into a bird's-eye view plane SVP at an arbitrary height H other than the first and second heights H1 and H2 are able to be obtained.

Obtaining first and second reference parameters REF1 and REF2 in advance, and obtaining proper application parameters corresponding to a height H of a bird's-eye view plane SVP, are both included in this example of calibration according to a preferred embodiment of the present invention.

Figure 7:
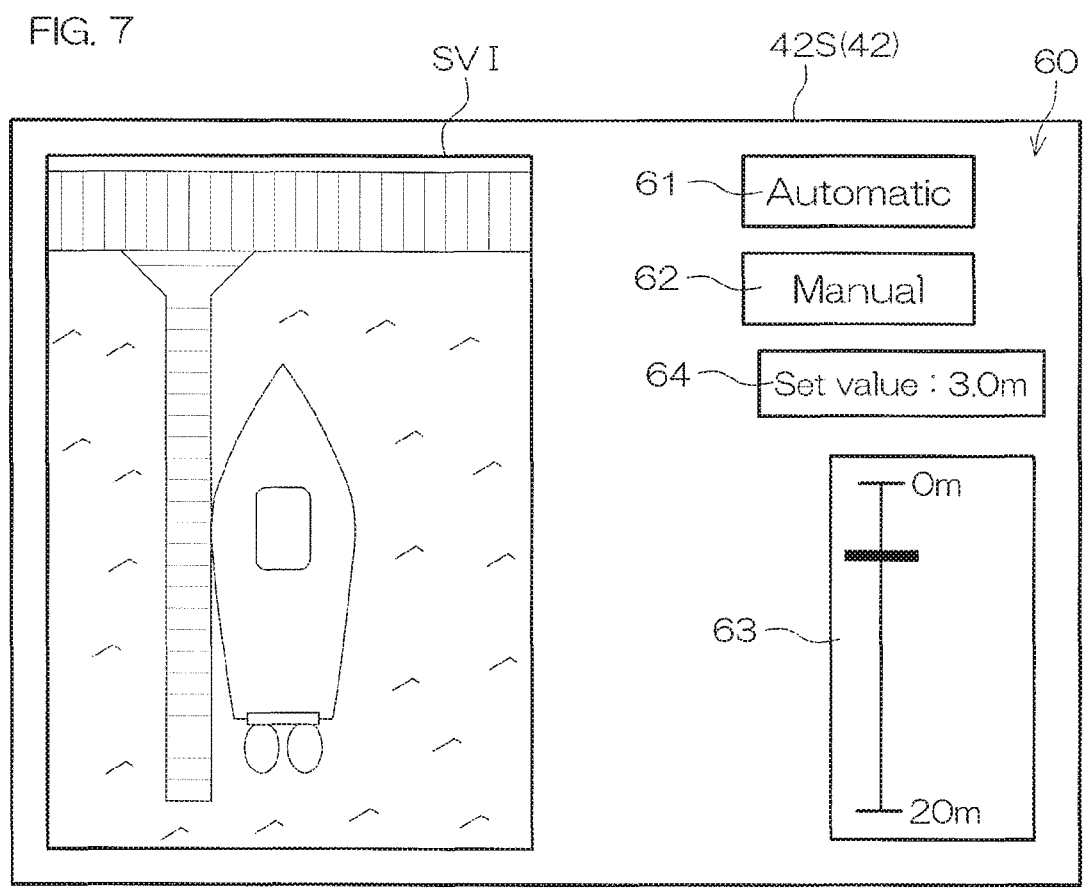
FIG. 7 shows an example of a display of a bird's-eye view image and an operation image for the input of a height of a bird's-eye view plane.

FIG. 7 shows an example of a display of the bird's-eye view image SVI on the display 42. On the display screen 42S of the display 42, the bird's-eye view image SVI and an operation image 60 are displayed. The operation image 60 includes, in this example, an automatic button 61, a manual button 62, a slider operation portion 63, and a set value display portion 64. The automatic button 61 is used to select an automatic mode in which parameters for projective transformation are calculated according to height detection by the height sensor 45. The manual button 62 is used to select a manual mode for an operator to manually input height information (information showing a relative height to the hull 2). The slider operation portion 63 is used to manually input height information. The set value display portion 64 displays height information set by operation of the slider operation portion 63. Respective operation inputs of the automatic button 61, the manual button 62, and the slider operation portion 63 are detected by the input 44 (for example, a touch panel disposed on the display screen 42S), and input into the processor 46.

Figure 8A:
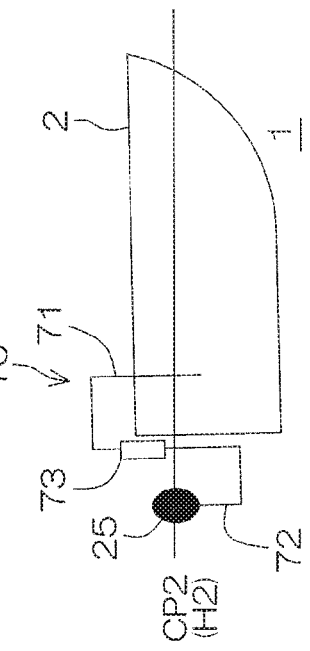
FIGS. 8A and 8B are schematic sectional views showing a jig to be used for calibration to obtain first and second reference parameters.
Figure 8B:
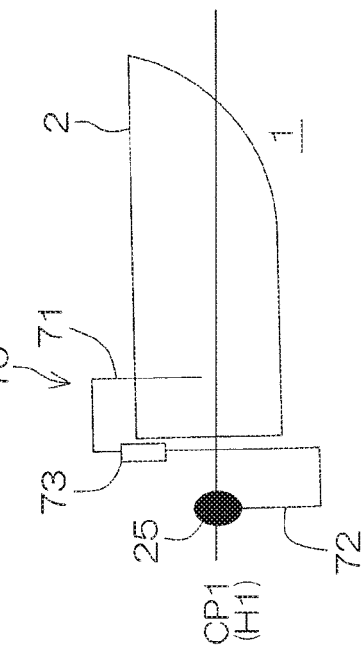

FIGS. 8A and 8B are schematic sectional views showing a jig 70 to be used for calibration to obtain the first and second reference parameters REF1 and REF2. The calibration is performed by positioning the calibration marker 25 in the overlapping region AB, BC, CD, DA of imaging regions 10A to 10D adjacent to each other of the cameras 7A to 7D. To obtain first reference parameters REF1, as shown in FIG. 8A, a first calibration marker 25 is positioned in a first calibration plane CP1 (preferably, a plane parallel or substantially parallel to the bird's-eye view plane, for example, a horizontal plane) set at a first height H1. To obtain second reference parameters REF2, as shown in FIG. 8B, a second calibration marker 25 is positioned in a second calibration plane CP2 set at a second height H2 (for example, a plane parallel or substantially parallel to the bird's-eye view plane, for example, a horizontal plane). The first calibration marker and the second calibration marker may be the same or different. In this preferred embodiment, the same calibration marker 25 is used as the first and second calibration markers.

The jig 70 is able to be supported by the hull 2 while holding the calibration marker 25. In greater detail, the jig 70 includes an attaching portion 71 that is attached to the hull 2, a marker holding portion 72 that holds the calibration marker 25, and a height adjusting portion 73 that changes a height of the marker holding portion 72 with respect to the attaching portion 71 and holds the adjusted height.

By attaching the jig 70 to the hull 2 and operating the height adjusting portion 73, the calibration marker 25 is positioned in the first calibration plane CP1 set at the first height H1 or the second calibration plane CP2 set at the second height H2.

In addition, the jig 70 is attached to the hull 2 and supported by the hull 2 so that in a state in which the vessel 1 is on land (refer to FIG. 1), the calibration marker 25 is positioned at the first height H1 and the second height H2 higher than the ground surface 15. That is, by using the jig 70, calibration is able to be performed on land.

Figure 9:
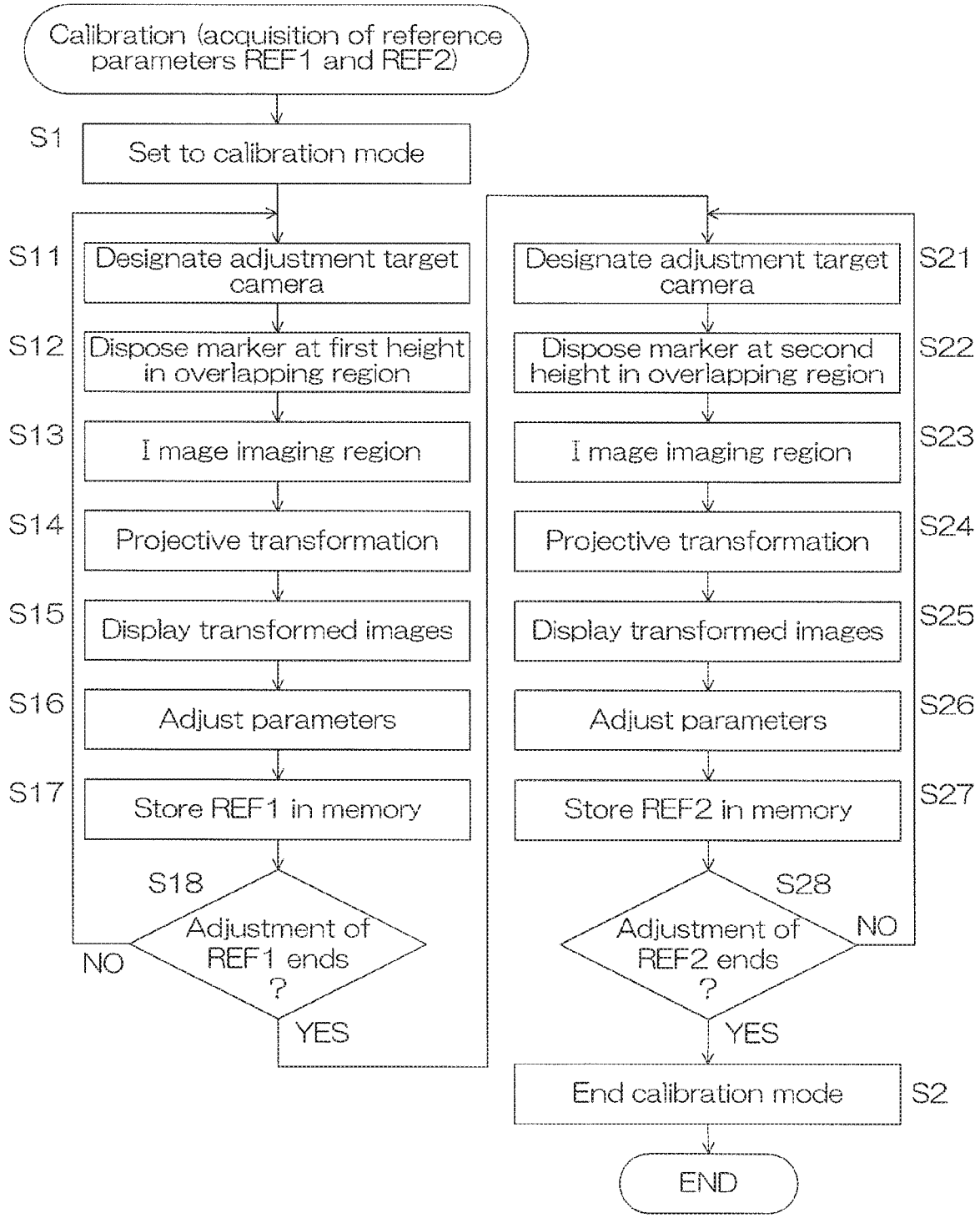
FIG. 9 is a flowchart describing a calibration procedure to acquire first and second reference parameters.

FIG. 9 is a flowchart describing a calibration procedure to acquire the first and second reference parameters REF1 and REF2.

This calibration is executed typically by a manufacturer of the vessel 1, a maintenance provider of the vessel 1, and/or a provider of the bird's-eye view image generating device 41, etc. These manufacturer/providers determine installation positions and postures of the cameras 7, and adjust installation positions and postures of the cameras 7. Depending on the installation positions and postures of the cameras 7, the positional relationships between the cameras 7 and the bird's-eye view plane SVP change. Therefore, calibration to acquire proper first and second reference parameters REF1 and REF2 is required.

In the case of a vehicle, installation positions and postures of the cameras to acquire a bird's-eye view image are fixed by the type of vehicle. On the other hand, in the case of the vessel 1, the installation positions and postures of the cameras are selected by the above-described manufacturer/providers, and there are no predetermined fixed positions or postures.

A calibration operator operates the input 44 to set the bird's-eye view image generating device 41 to a calibration mode (Step S1). Further, the operator operates the input 44 to designate a calibration target, that is, a camera 7 whose projective transformation parameters should be changed (Step S11). In addition, the operator positions the calibration marker 25 at the first height H1 in an overlapping region between an imaging region of the calibration target camera 7 and an imaging region of another camera 7 (Step S12).

In this state, with the calibration target camera 7 and the other camera 7 whose imaging region includes the overlapping region in which the calibration marker 25 is provided, their imaging regions are respectively imaged, and corresponding camera image data 51 are obtained (Step S13). The camera image data 51 are data showing first calibration images. The camera image data 51 thus obtained are subjected to projective transformation based on parameters stored in the memory 47, and accordingly, two bird's-eye view transformed image data 53 are generated (Step S14).

The operator operates the input 44 to cause the display 42 display an image of the bird's-eye view transformed image data 53 corresponding to the calibration target camera 7 (Step S15). In addition, the operator operates the input 44 to cause the display 42 overlay-display an image of the bird's-eye view transformed data 53 corresponding to the other camera 7 whose imaging region includes the overlapping region in which the calibration marker 25 is positioned (Step S15). At this time, as the images of the two bird's-eye view transformed image data 53, regions including the overlapping region are displayed on the display 42. The overlay display of the two bird's-eye view transformed image data 53 may be automatically performed without requiring operation of the input 44.

The operator checks if the displayed images are proper, and when the image of the calibration target camera has a problem, adjusts the parameters corresponding to the calibration target camera (for example, the left front camera 7A)

(Step S16). More specifically, the operator focuses on the calibration marker images 25A and 25B shown in the displayed two bird's-eye view transformed images 21A and 21B (refer to FIG. 4). When the projective transformation parameters are proper, the calibration marker images 25A and 25B included in the two bird's-eye view transformed images 21A and 21B overlap each other. When any of the projective transformation parameters are improper, the calibration marker images 25A and 25B included in the two bird's-eye view transformed images 21A and 21B deviate from each other. Therefore, when the calibration marker images 25A and 25B deviate from each other, the operator adjusts the parameters corresponding to the calibration target camera 7A so that the deviation between them is minimized and the calibration marker images 25A and 25B overlap each other (match each other). The adjusted parameters are stored as the first reference parameters REF1 of the calibration target camera in the memory 47 (Step S17).

The parameter adjustment may be made by using, for example, the input 44. In place of using the input 44, a personal computer with an installed dedicated tool may be connected to the processing device main body 43 to enable parameter adjustment. In this case, overlay display of the bird's-eye view transformed image data 53 may be made on a display equipped on the personal computer.

The parameter adjustment (Step S16) may be also made by automatic processing by the processor 46 or the above-described personal computer with an installed dedicated tool. More specifically, a program may be used to automatically recognize corresponding lattice points (two or more, preferably, three or more) in the two calibration marker images 25A and 25B based on image data, and obtain parameters to minimize the distance between the lattice points through automatic calculation.

The same procedure is repeated while the calibration target camera is changed in order (and cyclically as needed) (Step S18). This procedure is repeated until it reaches a state in which calibration marker images in bird's-eye view transformed images obtained from the two cameras having two imaging regions adjacent to each other sufficiently match each other when the calibration marker 25 is positioned in any of the overlapping regions AB, BC, CD, and DA. In this way, proper first reference parameters REF1 for all cameras are stored in the memory 47 (Step S18: YES). Until proper first reference parameters REF1 are obtained, the calibration operation may be performed twice or more for the same camera.

Next, the operator performs an operation to obtain second reference parameters REF2. First, the operator operates the input 44 to designate a calibration target camera (Step S21). In addition, the operator positions the calibration marker 25 at the second height H2 in an overlapping region between an imaging region of the calibration target camera and an imaging region of another camera (Step S22). In this state, with the calibration target camera 7 and the other camera 7 whose imaging region includes the overlapping region in which the calibration marker 25 is positioned, their imaging regions are respectively imaged, and corresponding camera image data 51 are obtained (Step S23). The camera image data 51 are data showing second calibration images. The camera image data 51 thus obtained are respectively projectively transformed based on corresponding parameters stored in the memory 47 (Step S24). Accordingly, two bird's-eye view transformed image data 53 are generated, and corresponding bird's-eye view transformed images are overlay-displayed on the display 42 (Step S25). Thereafter, as in the case of the first reference parameters REF1, second reference parameters REF2 of the calibration target camera 7 are obtained (Step S26), and stored in the memory 47 (Step S27).

The same procedure is repeated while the calibration target camera is changed in order (and cyclically as needed) (Step S28). This procedure is repeated until it reaches a state in which calibration marker images 25A and 25B in bird's-eye view transformed images obtained from the two cameras having two imaging regions adjacent to each other sufficiently match each other when the calibration marker 25 is positioned in any of the overlapping regions AB, BC, CD, and DA. In this way, proper second reference parameters REF2 for all cameras are stored in the memory 47 (Step S28: YES). Until proper second reference parameters REF2 are obtained, the calibration operation may be performed twice or more for the same camera.

When proper first and second reference parameters REF1 and REF2 are obtained for all cameras 7, the operator operates the input 44 to end the calibration mode.

Figure 10A:
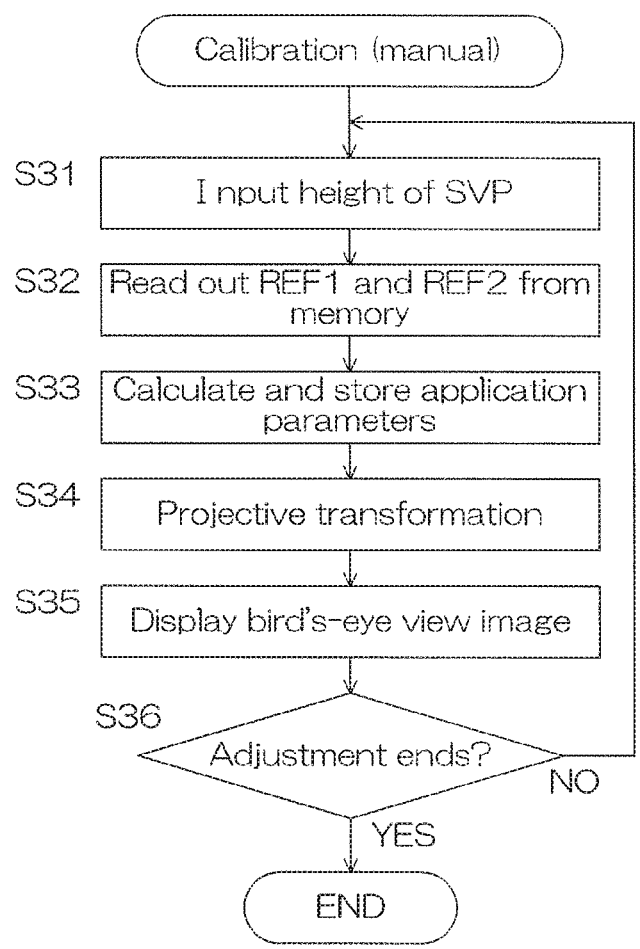
FIG. 10A is a flowchart describing calibration at the time of use, showing a flow of the calibration in a manual mode.

FIG. 10A and FIG. 10B are flowcharts describing calibrations to be performed in a state in which the first and second reference parameters REF1 and REF2 are stored in the memory 47. These calibrations are performed typically at the time of use of the vessel 1. FIG. 10A shows a flow of calibration in a manual mode. The operator in this manual calibration is typically a user of the vessel 1. FIG. 10B shows a flow of calibration in an automatic mode.

The calibration in the manual mode shown in FIG. 10A is started by operating the input 44 to display the bird's-eye view image SVI (refer to FIG. 7) and operating the manual button 62. The operator operates the slider operation portion 63 to input a height H of the bird's-eye view plane SVP (Step S31). Then, the processor 46 reads out the first and second reference parameters REF1 and REF2 from the memory 47 (Step S32), and based on these parameters and the input height H, calculates application parameters that should be applied to projective transformation (Step S33). Then, based on the calculated application parameters, the processor 46 obtains bird's-eye view transformed image data 53 by projective transformation of the camera image data 51, and stores the image data 53 in the memory 47 (Step S34). Then, the processor 46 synthesizes the bird's-eye view transformed image data 53 and the vessel image data 54 to generate a bird's-eye view image SVI, and displays the bird's-eye view image SVI on the display 42 (Step S35).

In the calibration in the automatic mode shown in FIG. 10B, height information H of the bird's-eye view plane SVP is acquired by the height sensor 45 (Step S41). Other calculations and processes (Step S32 to S36) are the same as in the case of the manual mode shown in FIG. 10A.

As described above, according to a preferred embodiment of the present invention, by projective transformation of a plurality of images respectively obtained by the plurality of cameras 7 into a bird's-eye view plane SVP, a bird's-eye view image SVI from a view point above the vessel 1 is generated. In the calibration to adjust the projective transformation parameters, the calibration marker 25 is positioned in a bird's-eye view plane SVP (first and second calibration planes CP1, CP2) set, on land, at a position higher than the ground surface. At this time, the calibration marker 25 is positioned in an overlapping region between the imaging regions adjacent to each other of the plurality of cameras 7. In this state, images (calibration images) obtained by the plurality of cameras 7 include an image of the calibration marker 25 in common. Then, the projective transformation parameters are adjusted so that calibration marker images 25A and 25B in the plurality of calibration images match each other when the plurality of calibration images are subjected to projective transformation. Accordingly, proper parameters that should be applied to the projective transformation are obtained.

According to a preferred embodiment of the present invention, in a state in which the vessel 1 is on land, a bird's-eye view plane SVP is set at a position higher than the ground surface, and calibration is performed by using a calibration marker 25 positioned in the bird's-eye view plane SVP. That is, without floating the vessel 1 on the surface of the water, the calibration is easily performed.

One or both of the first and second calibration planes CP1 and CP2 are preferably set to an assumed height of the bird's-eye view plane SVP. In this case, one or both of the first and second reference parameters are directly used as application parameters to be applied to the projective transformation.

According to a preferred embodiment of the present invention, in a state in which the calibration marker 25 is held by the jig 70 that is attachable to the vessel 1, calibration images are acquired. Therefore, the calibration marker 25 is easily and accurately positioned in a bird's-eye view plane SVP (calibration plane) set at a height spaced apart from the ground surface. That is, it is not necessary to hold the calibration marker 25 by a structure raised from the ground, so that the calibration marker 25 is easily positioned. The bird's-eye view plane SVP is a plane determined relative to the hull 2, so that by holding the calibration marker 25 by the vessel 1 with the jig 70, the calibration marker 25 is accurately positioned in the bird's-eye view plane SVP (calibration plane).

In addition, according to a preferred embodiment of the present invention, the jig 70 is able to change the height of the calibration marker 25 with respect to the vessel 1. Therefore, the relative height of the calibration marker 25 to the vessel 1 is changeable, so that calibrations with the varying height of a bird's-eye view plane SVP is easily performed.

Further, according to a preferred embodiment of the present invention, with respect to the first calibration plane CP1 at the first height H1 and the second calibration plane CP2 at the second height H2, a plurality of first calibration images and a plurality of second calibration images are respectively acquired (Steps S14 and S24). Then, first reference parameters REF1 for projective transformation of the plurality of first calibration images into the first calibration plane CP1 are obtained (Step S16). Similarly, second reference parameters REF2 for projective transformation of the plurality of second calibration images into the second calibration plane CP2 are obtained (Step S17). In this way, proper parameters for projective transformation are obtained for the first and second calibration planes CP1 and CP2 which are planes at the first and second heights H1 and H2 (preferably, planes parallel or substantially parallel to the bird's-eye view plane, for example, horizontal planes). Accordingly, proper parameters are able to be selected according to a variation or change in height H of the bird's-eye view plane SVP. Accordingly, an appropriate bird's-eye view image SVI is easily generated.

According to a preferred embodiment of the present invention, a height H of the bird's-eye view plane SVP is acquired by a user's operation input or automatic detection by the height sensor 45, and application parameters for projective transformation into the bird's-eye view plane SVP at the height H are acquired based on the first and second reference parameters REF1 and REF2. Accordingly, proper application parameters are acquired according to a variation or change in height H of the bird's-eye view plane SVP, so that an appropriate bird's-eye view image SVI is easily generated.

In the manual mode, proper application parameters with respect to a bird's-eye view plane SVP at a height H set by the operator are acquired, so that an appropriate bird's-eye view image SVI is easily generated.

In the automatic mode, a height H of a bird's-eye view plane SVP is detected by the height sensor 45 installed on the vessel 1, and application parameters for projective transformation into the bird's-eye view plane SVP at the detected height H are obtained based on the first and second reference parameters REF1 and REF2. Therefore, proper application parameters with respect to the bird's-eye view plane SVP at the height H detected by the height sensor 45 are acquired, so that without requiring operation by an operator, an appropriate bird's-eye view image SVI is easily generated.

According to a preferred embodiment of the present invention, first and second calibration markers 25 are respectively positioned on first and second calibration planes CP1 and CP2 set, on land, at positions higher than the ground surface. That is, in a state in which the vessel 1 is on land, the calibration planes CP1 and CP2 are set at positions higher than the ground surface, and by using calibration markers 25 positioned in the calibration planes CP1 and CP2, calibration is performed. Therefore, without floating the vessel on the surface of the water, the bird's-eye view image generating device 41 for a vessel is easily calibrated.

According to a preferred embodiment of the present invention, in the memory 47 of the processing device main body 43 of the bird's-eye view image generating device 41, first and second reference parameters REF1 and REF2 for projective transformation into the first calibration plane CP1 at a first height and the second calibration plane CP2 at a second height are stored. The processor 46 uses one or both of these first and second reference parameters REF1 and REF2 to calculate application parameters for projective transformation into the bird's-eye view plane SVP. Therefore, projective transformation using proper application parameters is performed according to a variation or change in height H of the bird's-eye view plane SVP, so that an appropriate bird's-eye view image SVI is easily generated.

While preferred embodiments of the present invention are described above, the present invention can further be carried out by other preferred embodiments. For example, in the preferred embodiments described above, first and second reference parameters REF1 and REF2 are obtained and stored in the memory 47, and application parameters corresponding to a height H of a bird's-eye view plane SVP are calculated based on the first and second reference parameters REF1 and REF2. However, when the bird's-eye view plane SVP is set at substantially two heights H with respect to the hull 2, the first and second heights H1 and H2 are adjusted to the heights H of the expected two bird's-eye view planes SVP. That is, the first and second calibration planes CP1 and CP2 may be first and second bird's-eye view planes, respectively. In this case, the first and second reference parameters REF1 and REF2 may be directly used as first and second application parameters. A user of the vessel 1 is only required to select either of the first and second application parameters by operating the input 44. Alternatively, corresponding to a height H detected by the height sensor 45, the processor 46 may select either of the first and second application parameters.

When the bird's-eye view plane SVP is expected to be set at one height H, the calibration marker 25 is positioned at the height H of the expected one bird's-eye view plane SVP, and in the same manner as in the case of the first and second reference parameters REF1 and REF2 described above, application parameters are obtained. Obtaining appropriate application parameters with respect to one height in this way is also an example of calibration according to a preferred embodiment of the present invention.

Further, it is also possible that the calibration plane is set at three or more heights, and three or more reference parameters or application parameters respectively corresponding to the heights are obtained.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method of calibrating a bird's-eye view image generating device for a vessel that generates a bird's eye view image of the vessel using projective transformation of images obtained by a plurality of cameras installed on the vessel into a bird's-eye view plane, and in which a plurality of imaging regions to be respectively imaged by the plurality of cameras are positioned so that imaging regions adjacent to each other have overlapping regions, the method comprising the steps of:

positioning a calibration marker in an overlapping region in the bird's-eye view plane at a position higher than a ground surface on land;

acquiring a plurality of calibration images by imaging the calibration marker with the plurality of cameras; and acquiring application parameters to be applied for projective transformation of the plurality of calibration images into the bird's-eye view plane so that images of the calibration marker included in the plurality of calibration images match each other;

wherein the step of acquiring a plurality of calibration images includes the steps of:

acquiring a plurality of first calibration images with the plurality of cameras in a state in which a first calibration plane is set at a first height and a first calibration marker is positioned in the overlapping region in the first calibration plane; and acquiring a plurality of second calibration images with the plurality of cameras in a state in which a second calibration plane is set at a second height different from the first height and a second calibration marker is positioned in the overlapping region in the second calibration plane.

2. The method according to claim 1, wherein the step of positioning the calibration marker includes using a jig that is supported by the vessel and holds the calibration marker.

3. The method according to claim 2, wherein the jig varies a height of the calibration marker with respect to the vessel.

4. The method according to claim 1, wherein
  the step of acquiring application parameters includes the steps of:
    acquiring first reference parameters for projective transformation of the plurality of first calibration images into the first calibration plane so that images of the first calibration marker included in the plurality of first calibration images match each other; and
    acquiring second reference parameters for projective transformation of the plurality of second calibration images into the second calibration plane so that images of the second calibration marker included in the plurality of second calibration images match each other.

5. The method according to claim 4, further comprising the steps of:
  acquiring a height of the bird's-eye view plane; and
  acquiring application parameters to be applied for projective transformation of images obtained by the plurality of cameras into the bird's-eye view plane based on the height of the bird's-eye view plane and one or both of the first reference parameters and the second reference parameters.

6. The method according to claim 5, wherein the step of acquiring a height of the bird's-eye view plane includes receiving an input of a height from an input that is operated by an operator of the vessel.

7. The method according to claim 5, wherein the step of acquiring a height of the bird's-eye view plane includes detecting a height of the bird's-eye view plane with a sensor installed on the vessel.

8. The method according to claim 4, wherein the first height and the second height are set at positions higher than the ground surface on land.

* * * * *